United States Patent [19]

White

[11] Patent Number: 5,117,072
[45] Date of Patent: May 26, 1992

[54] CONSTANT CURRENT NON-BRIDGING SECTION INSULATOR

[76] Inventor: Paul F. White, 70 Elmwood Rd., Wellesley, Mass. 02181

[21] Appl. No.: 784,150

[22] Filed: Oct. 30, 1991

Related U.S. Application Data

[63] Continuation-in-part of Ser. No. 581,780, Sep. 13, 1990, abandoned.

[51] Int. Cl.⁵ .............................................. B60M 1/18
[52] U.S. Cl. ............................................ 191/39; 191/6
[58] Field of Search ..................... 191/6, 39; 238/152; 307/146

[56] References Cited

U.S. PATENT DOCUMENTS

| 473,361 | 4/1892 | Short | 191/6 |
|---|---|---|---|
| 2,492,300 | 12/1949 | Lewis | 191/39 |
| 3,833,820 | 9/1974 | Itoh | 307/146 |
| 4,187,934 | 2/1980 | Senften | 191/39 |
| 4,250,982 | 2/1981 | Senften | 191/39 |
| 4,320,820 | 3/1982 | Elbert | 191/39 |

FOREIGN PATENT DOCUMENTS

| 0342540 | 11/1989 | European Pat. Off. | 191/39 |
|---|---|---|---|
| 2841434 | 1/1980 | Fed. Rep. of Germany . | |
| 1303456 | 4/1987 | U.S.S.R. . | |
| 1339040 | 9/1987 | U.S.S.R. . | |
| 1315839 | 5/1973 | United Kingdom | 191/39 |

*Primary Examiner*—David A. Bucci
*Assistant Examiner*—Scott L. Lowe
*Attorney, Agent, or Firm*—William Nitkin

[57] ABSTRACT

A section insulator including a plurality of discrete runners with associated diodes preventing current from passing from a first circuit to a second circuit and vice versa of a power line having separate circuits to prevent arcing as an electric vehicle's current collector passes along the section insulator between the first and second circuits while the vehicle maintains a constant flow of electric current as it passes along the section insulator.

4 Claims, 1 Drawing Sheet

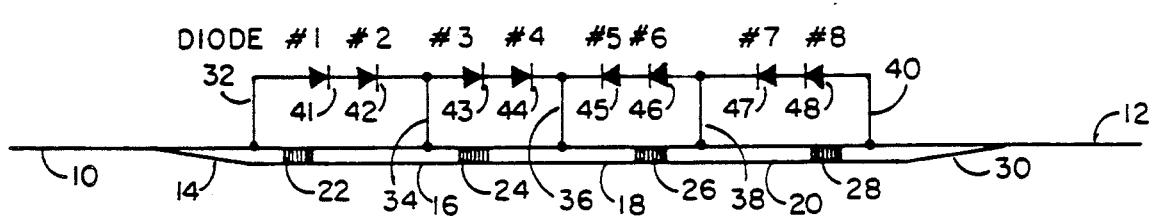

CONSTANT CURRENT NON-BRIDGING SECTION INSULATOR

This application is a continuation-in-part of my previous application Ser. No. 07/581,780 filed Sept. 13, 1990, now abandoned.

BACKGROUND OF THE INVENTION

1. Field of the Invention

This invention relates to a method and structure for insulating separate power circuits of overhead electrical contact lines used by light rail vehicles and the like and more particularly relates to a structure which prevents arcing between such power circuits as the vehicle's current collector passes along such lines.

2. Description of the Prior Art

Electrified light rail vehicles, trolleys, small railroad trains and the like use a pantograph contact, shoe contact or other type of current collector to supply the vehicle with power from a suspended overhead power line. Such overhead lines generally utilize a plurality of separate circuits along their length separated by insulators. The problem of arcing between the circuits in the prior art occurs when the pantograph or other current collector passes from one circuit to another along the overhead power line. Such arcing between the circuits creates significant heat and causes damage to the power lines and to the section insulators between the separate circuits which damage shortens the useful life of the power lines. This arcing problem is especially significant when the traveling pantograph or shoe does not bridge the gap between the two power circuits as it passes across the section insulator. Under normal conditions arcing occurs on the contact wire as the pantograph passes on to the insulator, and pitting will cause a decrease in the cross-sectional area of the wire over time which worn areas must be replaced with pieces of new contact wire on a periodic basis because if not frequently replaced, the contact wire will fail and break.

Structures in the prior art have tried to minimize this arcing effect such as suggested in U.S. Pat. No. 4,320,820 to Elbert for a Section Insulator with Improved Arc Control which discloses a system of changing current paths to redirect magnetic fields to cause the arcs to move in a direction away from the section insulators. Others have approached the problem in a different way. S. H. Short's Multiple Arc Railway System patented in 1892 in U.S. Pat. No. 473,361 sectionalizes a long piece of contact wire fed from one generator into many short sections where each is isolated by a separate fuse which allows sections to remain energized while other sections can be repaired. Problems with this type of structure include service disruption and the necessity of frequent fusible element replacement. Others have approached the problem using diode arrangements and quenching circuits controlled by SCR loops such as U.S. Pat. No. 3,833,820 to Itoh issued Sept. 3, 1974 and West German Patent 2841434 to Siei. In Morq, USSR Patent 1303456 it is suggested to divide the overhead system into sections. Another USSR patent which Applicant believes is the most pertinent of the prior art to the instant invention is No. 1339040 to Lupo. The Lupo patent utilizes contact wire and supporting messenger wire overlaps at anchor locations. The anchor locations are composed of two separate catenaries (contact wire and supporting messenger wires) which are parallel with the messenger above the contact wire, and overlap a distance so that the pantograph travels along the contact wire of one catenary and then on both contact wires (the overlap) and then on to the other contact wire of the other catenary. The current collector does not travel on the messenger but only on the contact wire. A typical overlap can be from 3-30 meters in length depending on the type of line construction and voltage. Insulating links with neutral inserts are attached to the contact wire, and the pantograph passes from the first circuit's contact wire by the first insulating link, by the central insulating link, by the second insulating link, and then onto the second circuit contact wire. During this passage an arc is created when the pantograph passes from the first contact wire through the insulating links, and the created arc is deionized in time due to the passage of current through a diode chain. This structure is designed for use on alternating current electric railroads using a catenary support system and requires heavy overlapping-type construction where anchoring locations in such catenary system must have additional poles with support spans and bracket arms with significant extra hardware. The structure cannot be placed at other locations on the line unless a specific overlap anchoring system is first installed. This structure is also subjected to significant electrical wear from half-wave arcing since it diminishes, but does not eliminate, the arcing factor. There is always the possibility of a locomotive or vehicle stopping with its pantograph between contact wire and the insulating link which, if occurring, would cause a continuous electrical arc to be drawn due to the auxiliary loads of the vehicle (heat, light, and compressor) and such arc would continue to burn until the contact wire was broken.

SUMMARY OF THE INVENTION

It is an object of this invention to provide a structure to insulate separate power circuits from one another on overhead contact lines associated with electrified light rail vehicle systems which systems can include trolleys, streetcars, mine locomotives, trolley buses and the like to prevent arcing from occurring between power circuits as the vehicle's current collector passes along such lines. The current collectors pass freely through and by the structure of this invention with no interruption to the current flow of the vehicle while at the same time not bridging the two power circuits to which the structure of this invention is interconnected.

The structure of this invention incorporates a main insulator to which the contact wire is terminated, a running/wearing surface which the current collector travels upon, a diode array held within an enclosure and a suspension system. The running/wearing surface consists of three main runners insulated from each other and insulated from the approach transition clamps. These runners are bolted together so as to form one long piece which is attached under the contact wire and main insulator. The current collector passes from the contact wire of one circuit to the entering transition clamp, along the main runners to the leaving transition clamp and then on to the contact wire of the other circuit smoothly. The running/wearing surface allows trolley poles with shoes and pantograph current collectors to pass through the structure in either direction. The power is transmitted to the three main runners insulated from each other and the power circuits through feeder tap jumpers attached to each main runner, the other end of which tap jumper being connected to diodes in a diode array as will be described further below.

Providing constant current to the collector and non-bridging of the two circuits are the primary objects of this invention. The transition clamps are energized due to direct connection with their associated power circuits. The entering transition clamp can be bolted to the first circuit contact wires, and leaving transition clamp can be bolted to the second circuit contact wire. Between the clamps insulated from one another and the clamps are runners A, B and C which are energized by interconnection to the power circuits with jumper cables in series with a plurality of diodes. A first jumper cable interconnects the first circuit through first and second diodes to runner A through a second jumper which, in turn, is interconnected through a third and fourth diode along a third jumper to runner B. First, second, third and fourth diodes are biased to allow current only to pass one way from the first circuit to runners A and B and will not allow any current to flow to the first circuit from the second circuit. The third jumper also extends through a fifth and sixth diode to a fourth jumper attached to runner C which also interconnects through a seventh and eighth diode to a fifth jumper attached to the second circuit. Fifth, sixth, seventh and eighth diodes are biased oppositely to first, second, third and fourth diodes so that fifth, sixth, seventh and eighth diodes only allow current from the second circuit to reach runners C and B; and fifth, sixth, seventh and eighth diodes prevent any current from the first circuit to reach the second circuit. As the current collector travels from the first circuit onto runner A, power is transmitted both from the contact wire of the first circuit and from the first jumper cable connected to the transition clamp through first and second diodes to the second jumper connected to runner A. Current cannot flow from the second circuit to runner A because it is blocked by the third and fourth diodes, preventing its travel in that direction. Current also cannot flow from the first circuit to the second circuit because it is blocked by fifth and sixth diodes. When the current collector is completely on the main runner A and does not bridge transition clamp, all current flows to the current collector from the first circuit through the first and second diodes. The third and fourth diodes prevent the current from the second circuit flowing to runner A and further prevent the current from the second circuit flowing into the first circuit. As the current collector travels onto runner B while it is still on runner A, it receives power from the first circuit through the second jumper cable attached to runner A and the third jumper cable attached to runner B. The current flows from the first circuit; through the first, second, third and fourth diodes; to runner B; but the current from the first circuit cannot flow to the second circuit due to the blocking action of the fifth, sixth, seventh and eighth diodes. The current collector also receives from runner B current from the second circuit through the third jumper. The current from the second circuit flows through the fifth, sixth, seventh and eighth diodes, through the third jumper, to runner B, but current from the second circuit cannot flow to the first circuit due to the blocking action of the first, second, third and fourth diodes. When the current collector is completely on the central runner B, it receives power from both the first circuit and the second circuit at the same time, but there is no feedback of current from either circuit to the other because of the blocking nature of the diode arrangement. When the current collector travels on to runner C and is still partially on runner B, it receives power from the first circuit and also power from the second circuit. When the current collector is completely on runner C and does not bridge runner B, all current flowing to the current collector is flowing from the second circuit as explained in further detail below.

No arcing or burning can take place in this invention because the insulators between the runners A, B, C and the transition clamps are shorter than the length of the conducting strips of the pantograph current collectors or trolley pole shoe current collectors. No arcing occurs because the pantograph collector conducting strips or trolley pole shoe overlap the insulators so that the voltage is equalized. With equal potential, the current going to the collector will not be interrupted at any time.

The design of this invention is especially useful for low voltage direct current service in the 3,000 volt or less range with either pantograph or trolley pole/shoe current type collector devices and can be used with light rail vehicles, trolley buses, mine locomotives, or electric railroad direct current locomotives.

The structure of this invention further provides for an easily replaceable wear surface that can be replaced without disturbing the tension in the contact wires and can be suspended with a soft-style parallelogram suspension support system.

DESCRIPTION OF THE PREFERRED EMBODIMENT(S)

Figure 1:
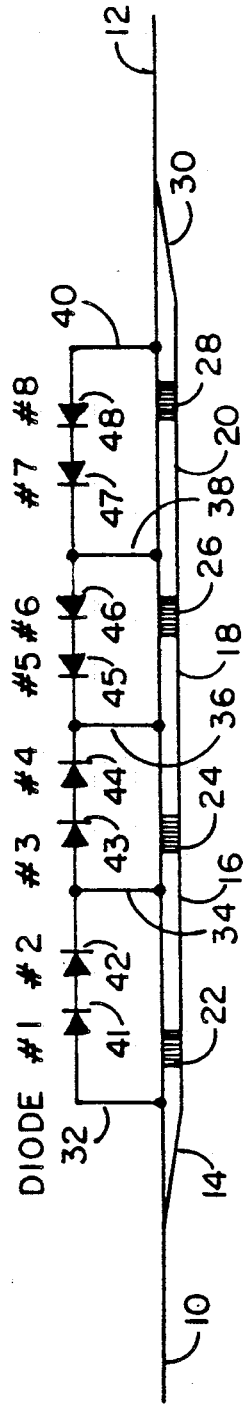
FIG. 1 illustrates a schematic drawing of the circuitry of this invention.

FIG. 1 illustrates first circuit 10 separated from a second circuit 12 by the structure of this invention. The collector pantograph or shoe travels along first circuit 10 and then travels along entering transition clamp 14 while still receiving current from the first circuit. A series of runners are disposed having insulators therebetween. Runner A 16 is insulated from the transition clamp 14 by insulator 22. Runner B 18 is insulated from runner A 16 by insulator 24 and runner C 20 is insulated from runner B 18 by insulator 26. Runner C 20 extends to the leaving transition clamp 30 which clamp is insulated from runner C 20 by insulator 28. Leaving transition clamp 30 extends to second circuit 12. Transition clamps 14 and 30 are energized due to their direct connection to their associated power circuit. The entering transition clamp 14 is bolted or otherwise attached to the contact wire of first circuit 10, and the leaving transition clamp is likewise bolted or attached to the contact wire of second circuit 12. Runners A, B and C are energized by connections to a series of power circuits through jumper cables as will be described below. As the current collector travels from first circuit 10 over the entering transition clamp 14, it passes onto runner A 16 and the power is transmitted from first circuit 10 to the current collector's contact. First jumper cable 32 attached to first circuit 10 passes the current through first and second diodes 41 and 42, respectively, and through second jumper cable 34 to runner A 16. No current can flow from second circuit 12 to main runner A because it is blocked by third and fourth diodes 43 and 44, respectively. Current cannot flow from first circuit 10 into second circuit 12 because it is also blocked by fifth and sixth diodes 45 and 46, respectively. When the current collector is completely on runner A 16 and does not bridge the entering transition clamp 14 or receive current from runner B 18, then all current flows to the current collector from first circuit 10 through first and second diodes 41 and 42, respectively. As the current collector travels onto runner B 18 and still has a portion on runner A 16, the collector receives power from first circuit 10 from second jumper cable 34 through first and second diodes 41 and 42, respectively, and through third jumper cable 36 which receives current from first circuit 10 through the first, second, third and fourth diodes and from second circuit 12 through the fifth, sixth, seventh and eighth diodes 45, 46, 47 and 48, respectively. Due to the blocking nature of the third and fourth diodes indicated by 43 and 44, respectively, the current from second circuit 12 cannot pass into first circuit 10 nor can the current from first circuit 10 pass to second circuit 12 because of the blocking nature of fifth and sixth diodes 45 and 46 preventing any current going in that direction. When the current collector is completely on runner B 18, it receives power from both the first and second circuits as described above. When the current collector passes on to runner C 20 and is still on runner B, it receives power from first circuit 10 through third jumper 36 with current passing through first, second, third and fourth diodes, 41, 42, 43 and 44, respectively, but current from the first circuit 10 cannot flow into second circuit 12 due to the blocking action of seventh and eighth diodes 47 and 48. The current collector also receives power from second circuit 12 through third jumper 36 attached to runner B 18 through fifth and sixth diodes 46 and 45, respectively, and power is directed to runner C 20 over fourth jumper 38 and through the eighth and seventh diodes 48 and 47, respectively. Current from second circuit 12 cannot flow into first circuit 10 due to the blocking action of fourth and third diodes 44 and 43, respectively. When the current collector is completely on runner C 20 and does not bridge at all on runner B 18 or leaving transition clamp 30, all of the current flowing to the current collector is from second circuit 12 through fourth jumper 38 extending to runner C 20 through the eighth and seventh diodes 48 and 47. The fifth and sixth diodes 45 and 46 prevent current from first circuit 10 from flowing to runner C 20 and the fourth and third diodes 44 and 43 prevent current from second circuit 12 from flowing to first circuit 10. As the current collector travels from runner C 20 onto leaving transition clamp 30, power is transmitted from the contact wire of second circuit 12 and from the fourth jumper cable 38 connected to runner C 20. Current in fourth jumper 38 flows from second circuit 12 through fifth jumper 40 and through eighth and seventh diodes 48 and 47. When the current collector travels off main runner C onto the leaving transition clamp 30 and directly onto second circuit 12, it will receive all of its power from the trolley contact wires of second circuit 12. The arcing and burning of the prior art does not take place because the insulators 22, 24, 26 and 28 between the transition clamps and runners A, B and C are shorter than the length of the conducting strips of the pantograph current collectors or trolley pole/shoe current collectors.

Figure 2:
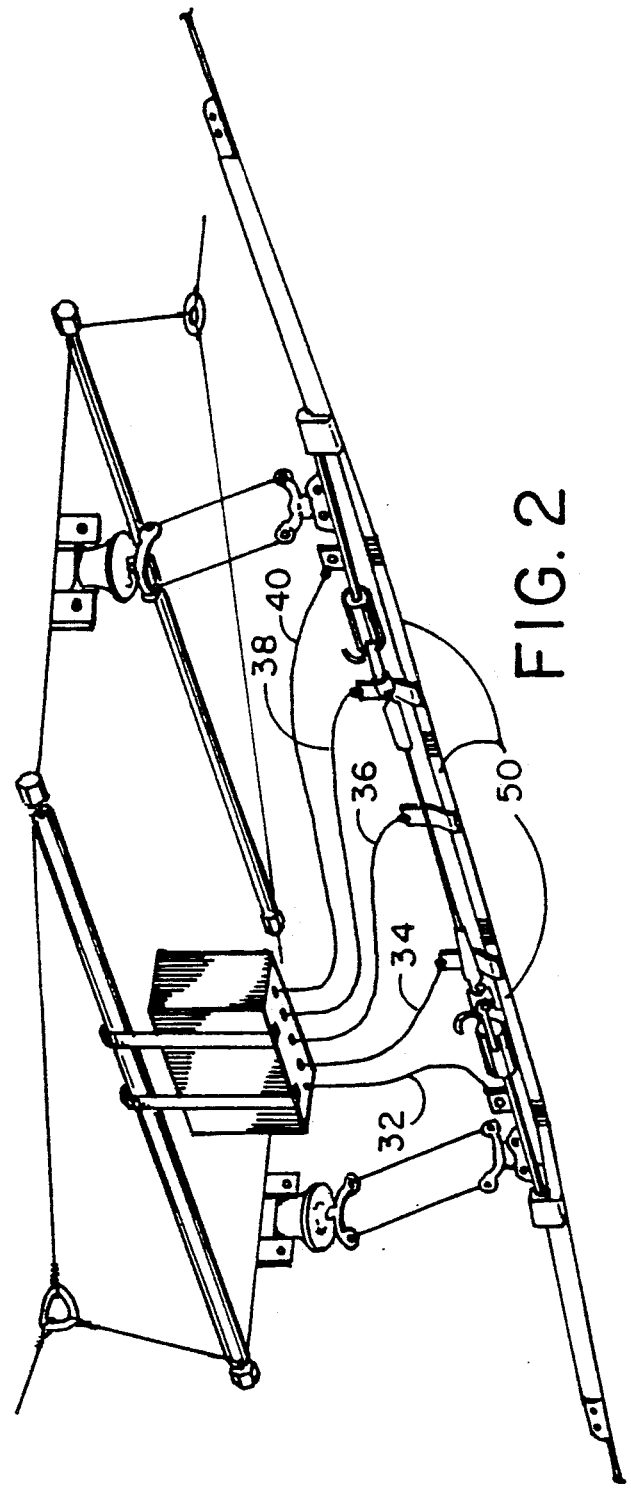
FIG. 2 illustrates a perspective view of the structure of this invention suspended by a support system.

As seen in FIG. 2, running/wearing surfaces 50 of runners A, B and C can easily be replaced when worn out without disturbing the tension in the contact wires by simply unbolting the wearing surface from the contact wires and removing it after first disconnecting the jumper cables. The new wearing surface can then be attached to the contact wires with the jumper wires then being reconnected. The suspension system can be attached only to the contact wires and does not have to be disturbed or dismantled during wear surface replacement procedures. Use of the structure of this invention which separates the electrical power circuits on the contact wires while providing insulation allows the current collectors to pass from one contact wire circuit to the adjoining circuit without losing power and without bridging the two power circuits. Electrical arcing that is associated with non-bridging section insulators is thereby avoided which arcing is eliminated due to the insulated conducting runners connected in series through the diode array as described above which arrangement prevents the current from one circuit passing to the other.

A further advantage in the design of this invention is that even though there is a minimal voltage drop across the diodes in the range of a few volts, the large potential differences required for destructive arcing does not occur. Destructive arcing is arcing which removes significant amounts of material in the section insulator running surfaces. The diode arrangement between the first and second circuits further equalizes the voltage potential to prevent arcing from any difference of potential between the two circuits. Tests have shown the voltage drop across the PN junction of the diodes chosen for this device is insignificant to create a potential difference which would create destructive arcing. A typical 3,000 volt diode drawing upwards of 1,000 amperes of current produces a voltage drop of only approximately 0.5–0.1 volt.

This structure of this invention, as discussed above, can be used with direct current overhead contact wire systems with voltages of 3,000 volts or less for electric railroads, light rail systems, trolley bus lines and underground mining operations. In underground mining operations, the structure of this invention is particularly useful because the absence of electrical arcing would help eliminate any explosions of gas which might be caused by such arcing. The structure of this invention can be installed on any type of contact wire system, either catenary or single contact wire. A suspension trapeze, as seen in FIG. 2, with the attached parallelogram wires can be utilized for soft suspension. The structure of this invention can also be used in catenary or direct hard suspension systems in locations where contact wire support bars or tube-running surface construction is needed at junctions or turnouts. The structure of this invention can be pre-bent or field-bent for use in curved construction. The diode enclosure can be supported at the trapeze on a catenary messenger or at a cross-span pole; or if utilized in a mine or subway, on the wall or ceiling. The structure of this invention can be placed anywhere in a length of contact wire even if it is under constant tension, and it does not require an overlap to be installed. The structure of this invention further is subjected to much less electrical wear because no arcing will take place and even though it is subject to mechanical wear from the current collectors, the replacement of the separate wear surfaces, not being under tension, is easier. Also, since the runners can be of large cross-sectional area with a high profile, extreme wear can be tolerated before replacement is needed and should the structure wear down to a point where it breaks and fails, only the wearing surface will be affected and the contact wires will remain intact.

In some embodiments an existing cut-in section insulator can be used to provide insulation in the contact wires and the wear surface conducting pieces can be attached under this insulator with the diode array enclosure placed on the existing section insulator support span. This arrangement would allow for the use of the structure at a section break using a non-bridging but arc-creating insulator or bridging insulator which would then become a constant-current non-bridging section insulator without the necessity of adding spanning supports.

Although the present invention has been described with reference to particular embodiments, it will be apparent to those skilled in the art that variations and modifications can be substituted therefor without departing from the principles and spirit of the invention.

I claim:

1. An insulator positioned between first and second circuits, each having first and second overhead contact wires respectively from first and second overhead power lines respectively provided for an electrically powered vehicle having a current collector, comprising:
   means to prevent current from said first circuit from passing to said second circuit and vice versa as said current collector passes from said first overhead contact wire to said second overhead contact wire;
   means to eliminate destructive arcing which would result from potential differences between said first and second circuits as said current collector passes from said first overhead contact wire to said second overhead contact wire; and
   means to allow said current collector to continuously collect current with no interruption in said current collection as it passes from said first overhead contact wire to said second overhead contact wire.

2. The device of claim 1 further including:
   means to prevent wear of said insulator positioned between said first and second overhead contact wires comprising a detachable runner used as a wearing surface along which said current collector runs, said runner not being in tension with said overhead power lines but separately attached to said first and second overhead contact wires; and
   means to allow a variety of types of current collectors to pass along said runner unencumbered.

3. An insulator positioned between a first and second circuit of a first and second overhead power contact line for an electric-powered vehicle having a current collector, said current collector having a contact length along each of said contact lines, said structure comprising:
   a runner separate from first and second overhead power contact lines, said runner interrupted by first, second, third and fourth insulators along its length, forming runner segments therebetween, said insulators spaced apart from one another, said insulators further being of a shorter length than the contact length of said current collector;
   first, second, third and fourth diodes directing current from said first circuit to the two sequential adjacent runner segments to said first circuit, said diodes being biased to prevent current from passing from said second circuit to said first circuit; and
   fifth, sixth, seventh and eighth diodes directing current from said second circuit to the two sequential adjacent runner segments to said second circuit, said diodes being biased to prevent current from passing from said first circuit to said second circuit; and
   said current collector further being of a length to bridge no more than two runner segments at a time.

4. A structure positioned between a first and second circuit of a first and second overhead power contact line for an electric-powered vehicle having a current collector, said current collector having a contact length along each of said contact lines, said structure comprising:
   an entering transition clamp having a first and second end with said first end of said entering transition clamp attached to the contact line of said first circuit;
   a first insulator having a first and second end, said first insulator being of a length shorter than said contact length of said current collector, said first end of said first insulator being attached to the second end of said entering transition clamp;
   a first runner having a first and second end, said first end being attached to the second end of said first insulator, said first runner being electrically conductive;
   a second insulator having a first and second end, said first end of second insulator being attached to the second end of said first runner;
   a second runner having a first and second end, said second runner being electrically conductive, said first end of said second runner being attached to the second end of said second insulator;
   a third insulator having a first and second end, said third insulator being of a length shorter than the contact length of said current collector, said first end of said third insulator being attached to the second end of said second runner;
   a third runner having a first and second end, said third runner being electrically conductive, said first end of said third runner being attached to the second end of said third insulator;
   a fourth insulator having a first and second end, said fourth insulator being of a shorter length than the length of said current collector, said first end of said fourth insulator being attached to the second end of said third runner;
   a leaving transition clamp having a first and second end, said first end being attached to the second end of said fourth insulator and the second end being attached to the contact line of said second circuit;
   a first jumper having a first and second end, said first end attached to the contact line of said first circuit;
   a power line extending from the second end of said first jumper;
   a first and second diode positioned on the power line from said first circuit, said first and second diodes adapted to allow current to pass from said first circuit through said diodes and to block any current passing in the opposite direction;
   a second jumper having a first and second end, said first end attached to said power line and positioned on said power line after said first and second diodes, the second end of said second jumper being attached to said first runner;
   a third and fourth diode positioned on said power line after said second jumper, said third and fourth diodes being positioned to allow current to pass therethrough from said first circuit but to block any electrical current from passing in the opposite direction;

a third jumper having a first and second end, said first end attached to said power line at a position after said third and fourth diodes with the second end of said third jumper being attached to said second runner;

a fifth and sixth diode positioned on said power line at a position after said third jumper, said fifth and sixth diodes positioned to prevent current from passing from said second circuit to said first circuit and to allow current to pass from said power line to said second runner;

a fourth jumper having a first and second end, said first end of said fourth jumper attached to said power line at a position after said fifth and sixth diodes with said second end of said first jumper extending to said third runner;

a seventh and eighth diode on said power line positioned after said fourth jumper adapted to prevent current from passing from said first circuit to said second circuit; and said power line extending after the position of said seventh and eighth diodes to the contact line of said second circuit, said structure adapted to receive current from both of said first and second circuits and for said first, second, third and fourth diodes to prevent current from passing from said second circuit to said first circuit even when said runners are bridged by the electrical contact of said current collector which current collector is adapted to bridge no more than two runners at a time and said fifth, sixth, seventh and eighth diodes prevent current from passing from said first circuit to said second circuit.

* * * * *